United States Patent [19]

Omoda et al.

[11] Patent Number: 4,651,274
[45] Date of Patent: Mar. 17, 1987

[54] VECTOR DATA PROCESSOR

[75] Inventors: Koichiro Omoda, Hadano; Shigeo Nagashima, Hachioji; Shunichi Torii, Kokubunji, all of Japan

[73] Assignee: Hitachi, Ltd., Tokyo, Japan

[21] Appl. No.: 594,301

[22] Filed: Mar. 28, 1984

Related U.S. Application Data

[63] Continuation of Ser. No. 283,837, Jul. 16, 1981, abandoned.

[30] Foreign Application Priority Data

Jul. 21, 1980 [JP] Japan ................................. 55-98741

[51] Int. Cl.[4] .......................... G06F 13/00; G06F 9/00
[52] U.S. Cl. .................................................... 364/200
[58] Field of Search ... 364/200 MS File, 900 MS File

[56] References Cited

U.S. PATENT DOCUMENTS

| | | | |
|---|---|---|---|
| 3,541,516 | 11/1970 | Senzig | 364/200 |
| 3,573,851 | 4/1971 | Watson et al. | 364/200 |
| 3,794,948 | 2/1974 | Deerfield et al. | 364/200 |
| 3,827,031 | 7/1974 | Kastner et al. | 364/200 |
| 3,919,534 | 11/1975 | Hutson et al. | 364/900 |
| 4,025,771 | 5/1977 | Lynch, Jr. et al. | 364/200 |
| 4,101,960 | 7/1978 | Stokes et al. | 364/200 |
| 4,128,880 | 12/1978 | Cray, Jr. | 364/200 |
| 4,172,287 | 10/1979 | Kawabe et al. | 364/200 |
| 4,293,941 | 10/1981 | Muraoka et al. | 364/200 |
| 4,302,818 | 11/1981 | Niemann | 364/200 |
| 4,354,231 | 10/1982 | Carlsson et al. | 364/200 |

Primary Examiner—Eddie P. Chan
Attorney, Agent, or Firm—Antonelli, Terry & Wands

[57] ABSTRACT

A vector data processor includes a vector index register for consecutively and sequentially storing indirect address vectors, which may then be consecutively and sequentially read out from the vector index register to form addresses of data, thereby to execute the consecutive reading of the data from a main storage and the consecutive writing thereof into the main storage with an increased processing speed by generating addresses and storing data in overlapping operations.

19 Claims, 8 Drawing Figures

FIG. 1(a) PRIOR ART

DIMENSION D(10), A(5)

$$D(A(1\sim5)) = \begin{Bmatrix} D(A(1)), D(A(2)), D(A(3)), D(A(4)) \\ D(A(5)) \end{Bmatrix}$$

VECTOR DATA PROCESSOR

This is a continuation of application Ser. No. 283,837 filed July 16, 1981, now abandoned.

BACKGROUND OF THE INVENTION

This invention relates to a data processor in which vector element data denoted in the list vector format are fetched from and stored into a main storage at high speed in order to execute a vector operation.

Figure 1A:
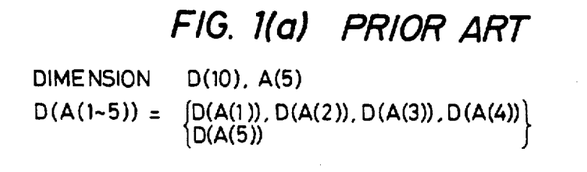
Figure 1B:
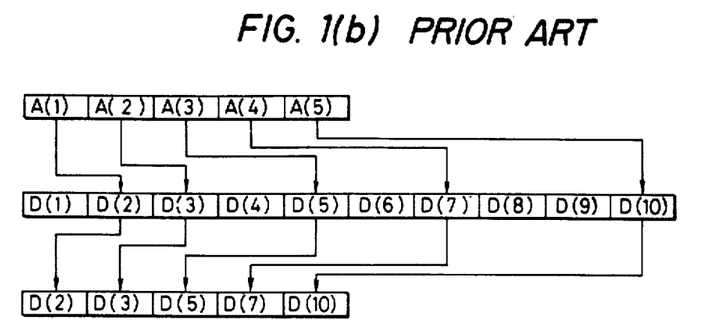
FIG. 1(b) is a diagram showing the relationship between an indirect address and vector data to be read out with the address.

An example of the method of denoting the list vector format is indicated in FIG. 1(a). This figure signifies that, from within a group of vector element data (hereinafter, simply written "data") D(1-10) consisting of 10 elements, the data of:

$$D(A(1-5)) = \{D(A(1)), D(A(2)), D(A(3)), D(A(4)), D(A(5))\}$$

is selected in accordance with the content of an indirect address vector (A(1-5) consisting of 5 elements representing an indirect address. That is, as illustrated in FIG. 1(b), within the data D(1-10) stored in a main storage, vector elements D(2), D(3), D(5), D(7) and D(10) which are respectively assigned by the indirect address vector elements A(1-5) are selected. Each element of the indirect address vector A(1-5) indicates the distance from the start address of the data D(1-10), i.e., D(1) to the elements D(i) to be assigned (address difference of these elements). Hereinbelow, this distance shall be called the "indirect address".

It is now supposed that the elements of data D(1−m) and the elements of an indirect address vector A(1−n) are respectively stored in the main storage regularly at equal distances and that m≧n holds. The distance between the adjacent elements of the indirect address vector shall be termed an "increment value". The steps to be performed in the case of fetching data D(A(1−n)) from the main storage under such conditions will be described with reference to FIGS. 2(a) and 2(b).

Figure 2A:
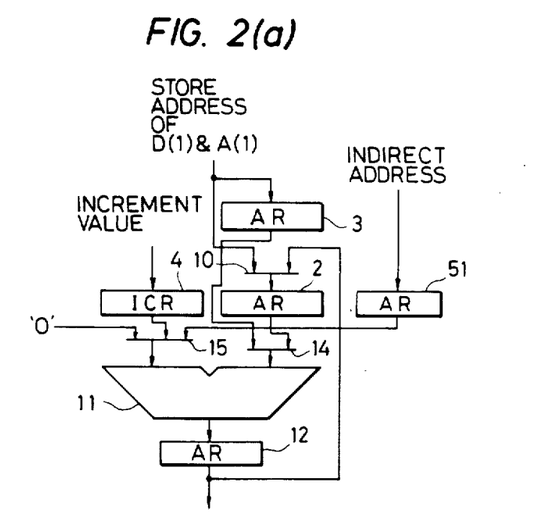
Figure 2B:
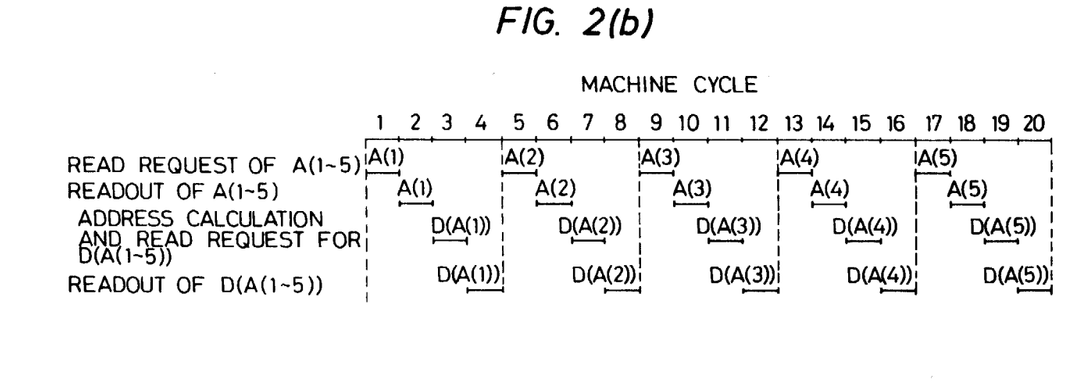
FIG. 2(b) is a time chart of the operation of the circuit.

FIG. 2(a) shows the outline of an address adding circuit, which may be used in a vector processor. FIG. 2(b) shows a time chart of a data fetch operation in the case of n=5. Before fetching the data, an increment value is set in an increment register 4, and the address of the first element D(1) of fetch data D(1−m) is set in an address register 3, and the address of a main storage (not shown) in which the first address A(1) of an indirect address vector A(1-5) is stored is set in an address register 2 through the selector 10.

First, the value of the address register 2 and the value zero are applied to an address adder 11 through a selector 14 and a selector 15, respectively. The added result, which comprises an address of the indirect address A(1) in the main storage, is stored into an address register 12, and it is thereafter transmitted to the main storage, as part of a read request. Simultaneously, the value stored in the address register 12 is set in the address register 2 through the selector 10.

Subsequently, the indirect address A(1) is read out from the main storage and is set in an address register 51. The values stored in the address register 3 and in the address register 51 are applied to the address adder 11 through the selector 14 and the selector 15, respectively. The added result, i.e., the address of an element D(A(1)), is transmitted to the main storage through the address register 12, as part of a read request. Next, the element D(A(1)) is read out from the main storage, to end the fetch processing of the first element D(A(1)).

Subsequently, in order to fetch an element D(A(2)), the values of the address register 2 and the increment register 4 are applied to the adder 11 through the selectors 14 and 15, respectively. The results of the addition, which comprises the address of the indirect address A(2) in the main storage, is stored in the address register 12. Thereafter, the main storage is accessed by the use of the address of the indirect address A(2), and the indirect address A(2) is set in the register 51. The indirect address A(2) and the content of the register 3 are applied to the adder 11 through the selectors 15 and 14, respectively, and the added result is used to read out the element D(A(2)) from the main storage.

Thereafter, the processings of the third and fifth elements are similarly executed to read out data D(A(3-5)). In this manner, the various processings of the read request of the indirect address A(i), the readout of A(i), the address calculation of the element D(A(i)) as well as the read request of D(A(i)), and the readout of D(A(i)) have ended, whereupon the processing of the next (i+1)-th element is executed.

However, it will be noted from the above description that the various processings for a plurality of elements cannot be overlapped. This leads to the problem that the speed of the vector data read-out operation becomes slow.

While the above description has been made of the case of reading out the data in the list vector indication, a similar problem is involved in case of writing data. As an example of the writing operation, there is considered a case where, in FIGS. 1(a) and 1(b), the data D(A(1-5)) is deemed an output result in a certain operation, and this value is written into a position for the data D(1-10) allotted in the main storage, in accordance with the value of the indirect address vector A(1-5). In this case, the indirect address vector A(1-5) may be either set in the main storage of, with the output result of a certain operation, stored in a vector register (registers for storing vector element data). In either case, there is the problem that the time of processing vector data is long.

SUMMARY OF THE INVENTION

This invention has for its object to provide a data processor in which, in the case of accessing a main storage to read or write data in the list vector indication therefrom or thereinto, the processing of address calculations for the access and the processing of accessing to the main storage with a calculated address can be executed in parallel with an access operation to means for storing vector data necessary for the access.

In order to accomplish this object, a data processor according to this invention comprises a vector index register which stores an indirect address vector, means for consecutively and sequentially storing indirect address vectors into the vector index register, and means for consecutively and sequentially reading out the indirect address vectors from the vector index register, to form address of data, thereby to carry out the consecutive reading of the data from a main storage and the consecutive writing thereof into the main storage.

These and other objects, features and advantages of the present invention will become more apparent from the following specific description of preferred embodiments, when taken in conjunction with the accompanying drawings.

BRIEF DESCRIPTION OF THE DRAWINGS

FIG. 1(a) is a diagram showing an example of vector indication in the list vector format, while

FIG. 2(a) is a diagram of a vector data readout address calculating circuit, while

DESCRIPTION OF THE PREFERRED EMBODIMENTS

Figure 3:
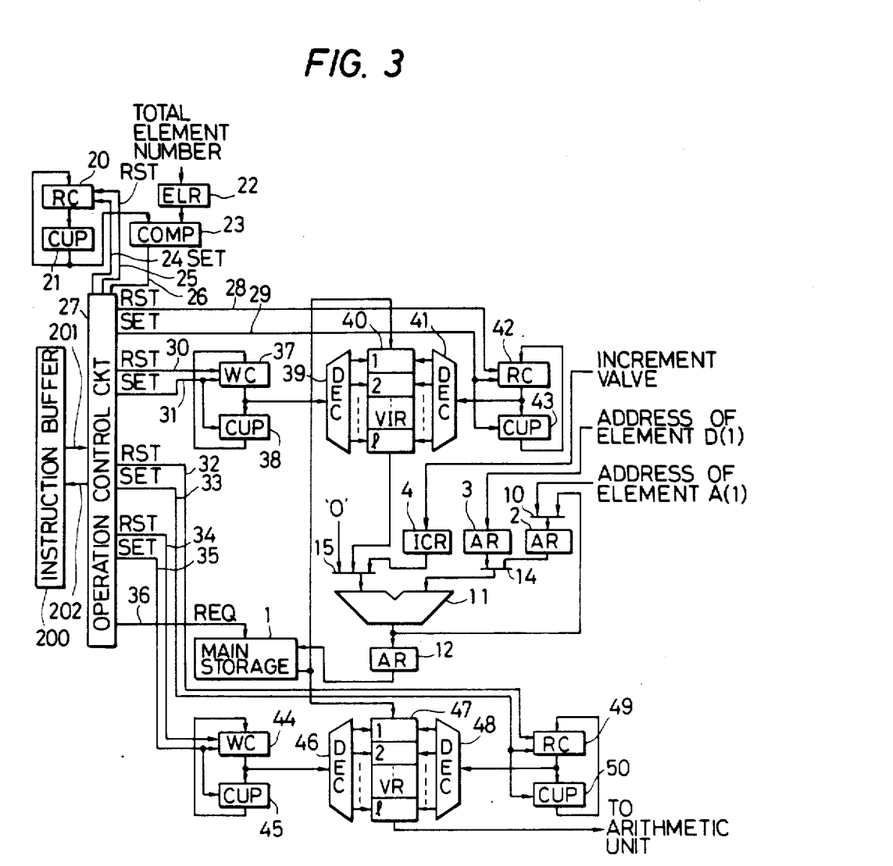
FIG. 3 is a schematic block diagram of a vector data processor according to this invention.

FIG. 3 shows an embodiment of this invention. The figure illustrates the construction of a processor in the case where data D(1−m) and an indirect address vector A(1−n) are respectively stored in a main storage regularly at equal distances and where data D(A(1−n)) is fetched from the main storage with reference to the indirect address vector A(1−n). Herein, it is assumed that $1 \leq A(i) \leq m$ (i = 1, 2, 3, . . . n) holds.

In the figure, the system comprises a main storage 1, address registers 2, 3 and 12, an increment register 4, selectors 10, 14 and 15, an address adder 11, an element counter (EC) 20, countup (+1 addition) circuits (CUPs) 21, 38, 43, 45 and 50, an element length register (ELR) 22, a comparator (COMP) 23, set signal lines (SETs) 24, 29, 31, 33 and 35, reset signal lines (RSTs) 25, 28, 30, 32 and 34, a coincidence signal line 26, an operation control circuit 27, a request signal (REQ) line 36, "write" counters (WCs) 37 and 44, decoders 39, 41, 46 and 48, a vector index register 40, "read" counters 42 and 49, a vector register 47, an instruction buffer 200, an instruction readout line 201, and an instruction end signal line 202. Both the vector register 47 and the vector index register 40 are constructed of l registers, and can store l items of data therein. The operation control circuit 27 may take the form of a conventional programmed sequence control of the type well known in the art.

While a case of $n \leq l$ will be referred to in the following description, data may be divided into processing units each consisting of l data items and then processed in case of $n > l$. A time chart of the present embodiment (the case of $n \leq l$) is shown in FIG. 4.

At the beginning of operation, the number n of elements to be processed is set in the element length register (ELR) 22, the increment value of the indirect address A(1−n) is set in the increment register (ICR) 4, the address of the head element D(1) of the data D(1−m) is set in the address register 3, and the address of the head element A(1) of the indirect address vector A(1−n) is set in the address register 2 through the selector 10.

Subsequently, the operation control circuit 27 loads the instruction for reading the indirect address vector A(1−n) out of the main storage 1 and for storing it into the vector index register (VIR) 40, from the instruction buffer 200 through the instruction readout line 201. The operation control circuit 27 decodes the instruction and performs controls necessary for an operation as follows. First, it provides the reset signals (RSTs) 25 and 30, to clear the element counter (EC) 20 and the write counter (WC) 37 to zero, respectively. Subsequently, it transmits the set signal (SET) 24, to increment the value of the element counter 20 by means of the countup circuit (CUP) 21. At this time, the output of the countup circuit 21 is applied to the comparator (COMP) 23 and is compared with the value of the element length register 22 therein. If, as a result of the comparing operation, both the values are equal, the coincidence signal 26 is transmitted to the operation control circuit 27 and is used for the decision indicating the end of the operation. The set signal 24 is transmitted every cycle in a manner to be repeated n times until the conicidence signal 26 is detected, and the request signal (REQ) 36 is transmitted to the main storage 1 in synchronism with the operation of the set signal 24.

Figure 4:
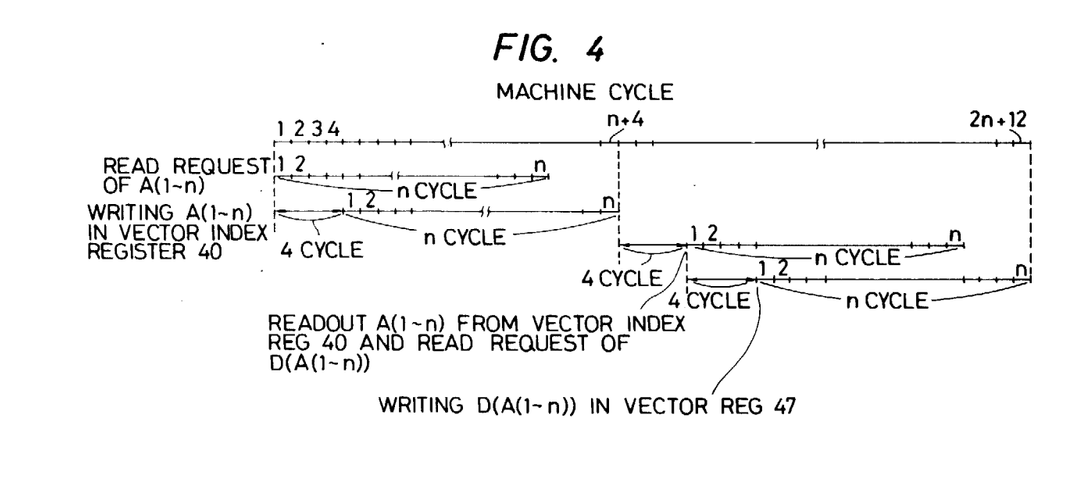
FIG. 4 is a time chart of the operation of the processor in FIG. 3.

The request signal 36 functions to instruct the main storage 1 to deliver the indirect address vector A(1−n), and it is transmitted every cycle in a manner to step from element No. 1 to element No. n as illustrated in FIG. 4. At this time, readout addresses from the main storage 1 are formed in the following way. The address of the first element A(1) is formed by applying the value of the address register 2 and data "0" to the address adder 11 through the selectors 14 and 15, respectively, and adding both the values (in substance, the value itself of the address register 2). The added result is transmitted to the main storage 1 through the address register 12. At this time, the added result is also set in the address register 2 through the selector 10 so as to be used for forming the address of the next element A(2). The address of the second element A(2) is formed in such a way that the value of the address register 2 set by the address calculation of the first element and the value of the increment register 4 are applied to the address adder 11 through the selectors 14 and 15, respectively, and that both the values are added. The added result is transmitted to the main storage 1 through the address register 12, and is simultaneously set in the address register 2 through the selector 10, to be used in case of forming the address of the third element A(3). Thereafter, the addresses are successively formed by similar operations and are pipeline-controlled so as to be transmitted to the main storage every cycle in synchronism with generation of the request signal 36.

Subsequently, the set signal 31, which is a signal delayed by four cycles with respect to the request signal 36, is transmitted. Upon the transmission of the set signal 31, the value of the write counter (WC) 37 is applied to the countup circuit 38 so as to be incremented thereby, and the result is stored in the counter 37. At the same time, the value of the write counter 37 before the countup is decoded by the decoder 39, and the indirect address vector A(1−n) read out from the main storage 1 is stored into the corresponding register of the vector index register 40 assigned by the decoded result. It is supposed that the readout data from the main storage 1 reaches the vector index register 40 in four cycles after the transmission of the request signal 36. As shown in FIG. 4, the writing of the indirect address vector A(1−n) into the vector index register 40 is started four cycles after the first set signal 24 has been transmitted, that is, after the first request signal 36 has been transmitted. It is executed in each of n cycles. In this way, the indirect address A(i) are successively retrieved from the main storage 1 and stored in the respective registers of the vector index register 40.

After the above processings have ended, the operation control circuit 27 transmits the instruction end signal 202 to the instruction buffer 200 and loads an instruction to be subsequently processed, or the instruction of bringing the list vector D(A(1−n)) from the main storage 1 to the vector register 47, on the basis of the indirect address A(1−n) stored in the vector index register 40, from the instruction buffer 200 through the instruction readout line 201. It decodes the instruction and performs controls necessary for an operation as follows. First, it transmits the reset signals 25, 28 and 34, to clear the element counter 20, the read counter 42 and the write counter 44 to zero, respectively. Subsequently, it transmits the set signal 24, to increment the value of the element counter 20 by means of the countup circuit 21. At this time, the output of the countup circuit 21 is applied to the comparator 23, the output of which is used for the decision identifying the end of operation as stated before. The set signal 24 is transmitted in each of n cycles until the coincidence signal 26 is detected, and the set signal 29 and the request signal 36 are transmitted in synchronism with the set signal 24. The request signal 36 functions to instruct the main storage 1 to deliver the list vector D(A(1−n)), and it is transmitted every cycle (in synchronism with the set signal 24) in a manner to step from elements No. 1 to No. n as illustrated in FIG. 4. The timing at which the first request signal is transmitted in four cycles after the element A(n) has been written into the vector index register 40 in the foregoing processings.

In synchronism with the request signal 36, a readout address is transmitted to the main storage 1 through the address register 12. This address is formed as follows. When the set signal 29 has been transmitted in synchronism with the request signal 36, the value of the read counter 42 is applied to the countup circuit 43 and is incremented thereby to "plus 1". Simultaneously therewith, the value of the write counter 42 (before the countup) is decoded by the decoder 41, and an indirect address is read out from register assigned by the decoded result and is applied to the address adder 11 through the selector 15. The other input of the address adder 11 receives the value of the address register 3 through the selector 14. The address of the added result is transmitted to the main storage 1 through the address register 12.

Subsequently, the set signal 35, which is a signal delayed by four cycles with respect to the request signal 36, is transmitted. Upon the transmission of the set signal 35, the value of the write counter 44 is applied to the countup circuit 45 to be incremented thereby. At the same time, the value of the write counter 44 before the countup is decoded by the decoder 46, and the data D(A(1−n)) read out from the main storage 1 is successively stored into that register of the vector register 47 assigned by the decoded result. It is supposed that the data read out from the main storage 1 will reach the vector register 47 in four cycles after the transmission of the request signal 36. As shown in FIG. 4, the writing of the data D(A(1−n)) into the vector register 47 is started four cycles after the first request signal 36 has been transmitted, and it is executed in each of n cycles.

After the end of the above processings, the operation control circuit 27 transmits the instruction end signal 202 to the instruction buffer 200 to complete the readout of the list vector D(A(1−n)). In the case where, for example, the instruction of transmitting to an arithmetic unit the values fetched into the vector register 47 is the next instruction, the values of the vector register 47 are successively read out by the use of the read counter 49 (as stated before, the zero clear owing to the reset signal 32 needs to be effected in advance), the countup circuit 50 and the decoder 48 and in synchronism with the set signals 33 transmitted from the operation control circuit 27, whereupon they are transmitted to the arithmetic unit.

Figure 5:
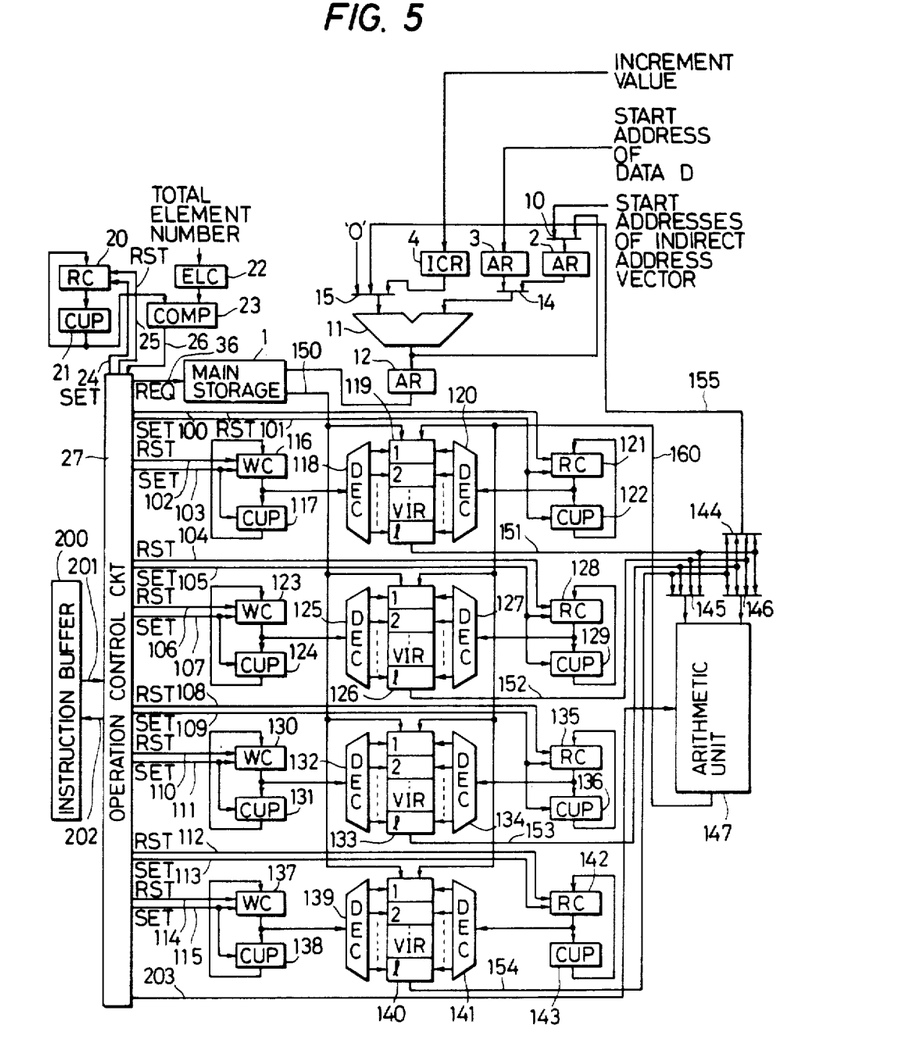
FIG. 5 is a schematic block diagram of another vector data processor according to this invention.

FIG. 5 shows another embodiment of this invention. Those elements in the figure not included in FIG. 3 include write counters 116, 123, 130 and 137, countup circuits 117, 122, 124, 129, 131, 136, 138 and 143, decoders 118, 120, 125, 127, 132, 134, 139 and 141, vector registers 119, 126 and 133, a vector register 140, read counters 121, 128, 135 and 142, reset signal lines 100, 102, 104, 106, 108, 110, 112 and 114, set signal lines 101, 103, 105, 107, 109, 111, 113 and 115, selectors 144–146, an arithmetic unit 147, and an operation instruction signal line 203. Hereunder will be described the operation of this embodiment in the case where data D(A(1−n)+B(1−n)) in the list vector indication is fetched from the main storage 1. While, in the embodiment of FIG. 3, the vector index register 40 is used only for storing the indirect address, the vector registers 119, 126 and 133 in the present embodiment are capable of storing data other than the indirect address, i.e., they are capable of the same use as that of the vector index register 40 as well as the vector register 47 in FIG. 3. D(1−m), A(1−n) and B(1−n) are assumed to be stored in the main storage 1 regularly at equal distances and to satisfy the following condition:

$$1 \leq A(i) + B(i) \leq m$$

(where i = 1, 2, 3, ..., n)

Figure 6:
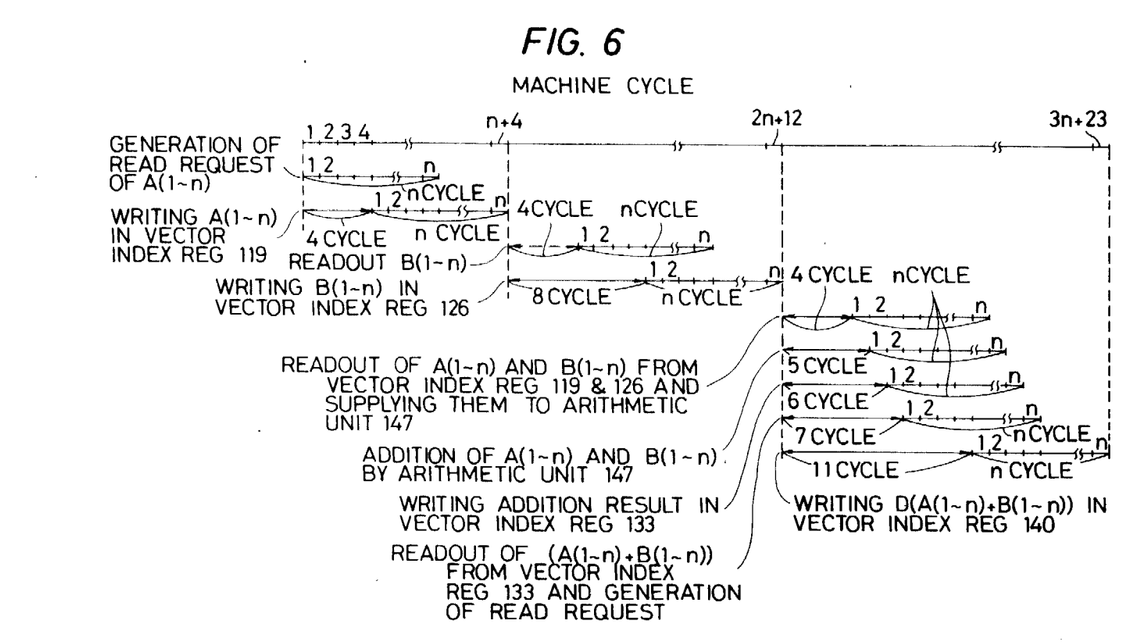
FIG. 6 is a time chart of the operation of the processor in FIG. 5.

In the description of the present embodiment n≦l (l denotes the number of registers of the vector register) is assumed and a time chart of the operation is shown in FIG. 6.

(1) Reading of A(1−n):

In the beginning, the number n of elements is set in the element length register 22, the increment value is set in the increment register 4, and the address of the head element A(1) is set in the address register 2 through the selector 10.

Subsequently, the operation control circuit 27 loads the instruction for reading out indirect addresses A(1−n) from the main storage 1 and for storing them into the vector register 119, from the instruction buffer 200 through the instruction readout line 201. The operation control circuit 27 denotes the instruction and performs controls necessary for this operation as follows. First, it transmits the reset signals 25 and 102 to clear the element counter 20 and the write counter 116 to zero, respectively. Continuously, it transmits the set signal 24 to increment the value of the element counter 20 by means of the countup circuit 21. At this time, the output of the countup circuit 21 is applied to the comparator 23 and is compared with the value of the element length register 22 therein. If, as the result of the comparing operation, both the values are equal, the coincidence signal 26 is transmitted to the operation control circuit 27 and is used for the decision of an end of the operation. The set signal 24 is transmitted in each of n cycles until the coincidence signal 26 is detected, and the request signal 36 is transmitted to the main storage 1 in synchronism with the set signal 24.

The time chart of FIG. 6 shows the time relations after the read request of A(1) or the first request signal 36 is transmitted. As shown in FIG. 6, the request signal 36 is transmitted every cycle in a successive manner from element No. 1 to No. n. Readout addresses need to be successively formed in synchronism with the request signals, and the address formation is the same as in the case of reading out A(1−n) in the embodiment of FIG. 3.

Subsequently, the set signal 103 which is a signal with the request signal 36 delayed four cycles is transmitted. Using the set signals 103, address A(1−n) read out from the main storage 1 are successively stored into the vector register 119 connected with the main storage by a data line 150. The control in this case is effected with the write counter 116, the countup circuit 117 and the decoder 118 and by the same method as in the case of reading out addresses A(1−n) in the embodiment of FIG. 3. As shown in FIG. 6, the writing of A(1−n) into the vector register 119 is started four cycles after the first request signal 36 has been transmitted, and it is executed in each of n cycles.

(2) Reading of B(−n):

After the end of the above processings, the operation control circuit 27 transmits the instruction end signal 202 to the instruction buffer 200. Continuously, it sets the increment value in the increment register 4 and the start address in the address register 2. Subsequently, the operation control circuit 27 loads from the instruction buffer 200 an instruction to be processed next, i.e., the instruction of reading out B(1−n) from the main storage 1 and storing them into the vector register 126, and it performs controls necessary for these processings. First, it transmits the reset signals 25 and 106, to clear the element counter 20 and the write counter 123 to zero, respectively. Subsequently, it transmits the set signal 24, the request signal 36 (synchronous with the set signal 24) and the set signal 107 (with the request signal 36 delayed four cycles). The method of forming the readout address synchronous with the request signal 36 is the same as in the case of reading out addresses A(1−n) in the embodiment of FIG. 3. In synchronism with the set signals 107, addresses B(1−n) read out from the main storage 1 are successively stored into the vector register 126 connected with the main storage 1 through the data line 150. The control in this case is made as in the case of the embodiment of FIG. 3 by the use of the write counter 123, the countup circuit 124 and the decoder 125. As illustrated in FIG. 6, the request signal 36 has its transmission started at the fourth cycle after A(n) has been stored into the vector index register 119, and it is transmitted every cycle in a manner to be repeated n times. Addresses B(1−n) are successively stored into the vector index register 126 with the delay of four cycles with respect to the request signals 36.

(3) Operation of A(1−n)+B(1−n) and Reading of D(A(1−n)+B(1−n)):

After the end of the processings of item (2), the operation control circuit 27 transmits the instruction end signal 202 to the instruction buffer 200. Subsequently, it sets the start address of D(1−m), i.e., the address of the element D(1) in the address register 3.

At the next step, the operation control circuit 27 loads from the instruction buffer 200 through the instruction readout line 201, the instruction of reading out A(1−n) and B(1−n) from the vector registers 119 and 126, respectively, and adding them in the arithmetic unit 147 and then storing the added result into the vector register 133, and the instruction of bringing into an indirect address the data A(1−n)+B(1−n) to be stored in the vector register 133 and then reading out D(A(1−n)+B(1−n)) from the main storage 1 and storing this data into the vector register 140. Thereafter, the operation control circuit 27 performs controls necessary for these processings. First, it transmits the reset signals 25, 100, 104, 110, 108 and 114, to clear the element counter 20, the read counter 121, the read counter 128, the write counter 130, the read counter 135 and the write counter 137 to zero, respectively. Continuously, it transmits the set signal 24, to increment the value of the element counter 20 by means of the countup circuit 21. At this time, the output of the countup circuit 21 is applied to the comparator 23 and is compared with the value of the element length register 22 therein. The set signal 24 is transmitted every cycle in a manner to be repeated n times until the coincidence signal 26 is detected, and the set signal 101 and the set signal 105 are transmitted from the operation control circuit 27 in synchronism with this set signal 24. In addition, the operation instruction signal 203 with the set signal 101 delayed one cycle and the set signal 111 with the same delayed two cycles are transmitted. Upon the transmission of the set signal 101, the values of A(1−n) stored in the index register 119 are read out and are applied to the arithmetic unit 147 through the line 151 as well as the selector 145. Upon the transmission of the set signal 105, the values of B(1−n) stored in the vector register 126 are read out and are applied to the arithmetic unit 147 through the line 152 as well as the selector 146. In the case of reading out A(1−n) from the vector register 119, the control is effected with the read counter 121, the countup circuit 122 and the decoder 120, while in the case of reading out B(1−n) from the vector register 126, the control is effected with the read counter 128, the countup circuit 129 and the decoder 127. The data read out from the vector registers 119 and 126 is applied to the arithmetic unit 147, is added in one cycle on the basis of the operation instruction signal 203 instructive of the addition, and the result is stored into the vector register 133 through the line 160 in one cycle after the operation. The storing of the operated result is made in synchronism with the set signal 111. At this time, the control is effected with the write counter 130, the countup circuit 131 and the decoder 132. The point of time at which the first elements A(1) and B(1) are respectively read out from the vector registers 119 and 126 is, as illustrated in FIG. 6, four cycles after B(n) has been read out from the main storage 1 and stored into the vector register 126 in the processings of the preceding time. Thereafter, A(1−n) and B(1−n) are successively read out in each of n cycles. The operation in the arithmetic unit 147 is performed one cycle after the readout, and the storing of the operation result occurs two cycles after the readout.

Subsequently, the set signal 109 which is a signal with the set signal 101 delayed three cycles, as well as the request signal 36, and the set signal 115 which is a signal with the set signal 101 delayed seven cycles, are transmitted from the operation control circuit 27. Upon the transmission of the set signal 109, A(1−n)+B(1−n) is read out from the vector register 133 and are transferred to the address adder 11 through the line 153, the selector 144, the line 155 and the selector 15. The other input of the address adder receives the value of the address register 3, these two inputs are added, and the result is transferred to the main storage 1 through the address register 12 as the readout address of $D(A(1-n)+B(1-n))$. In synchronism with the address transfer, the request signal 36 stated above is transmitted from the operation control circuit 27 to the main storage 1. In the readout of the vector register 133, the control is effected with the read counter 135, the countup circuit 136 and the decoder 134. The readout data $D(A(1-n)+B(1-n))$ from the main storage 1 reaches the vector register 140 through the line 150 and is stored therein in four cycles after the transmission of the request signal 36. This storing is controlled with the write counter 137, the countup circuit 138 and the decoder 139 in synchronism with the set signal 115.

As illustrated in FIG. 6, the readout of $A(1-n)+B(1-n)$ from the vector register 133 and the readout request for $D(A(1-n)+B(1-n))$ are started one cycle after $A(1)+B(1)$ delivered from the arithmetic unit 147 has been stored in the vector register 133. Thereafter, they are made every cycle in a manner to succeed n times. The readout data $D(A(1-n)+B(1-n))$ from the main storage 1 is stored in the vector register 140 with a delay of four cycles from the readout request or the transmission of the request signal 36. After the last element $D(A(n)+B(n))$ has been stored into the vector register 140, the operation control circuit 27 transmits the instruction end signal 202 to the instruction buffer 200, to complete the processings.

In the case where, by way of example, the data stored in the vector register 140 is sequentially transferred to the arithmetic unit 147, the transfer is controlled with the read counter 142 (which is cleared into zero by the reset signal 112 as stated before), the countup circuit 143 and the decoder 141, and the data is read out in synchronism with the set signals 113. It has been assumed that the readout data from the main storage 1 is stored into the vector register four cycles after the transmission of the request signal 36, but this case is not restrictive. The overhead of four cycles has been assumed as the partition of instruction processings, but the control ought to be made so that this number of cycles may become as small as possible. Although, in the present embodiment, the case of reading out the data in the list vector indication from the main storage has been described, also a case of writing data into the main storage can be readily realized in the same way.

As set forth above, according to this invention, the generation of the reading or writing address of vector data and the storing of read-out vector data into a register can be overlapped. Therefore, the processing speed of vector data is enhanced.

While we have shown and described several embodiments in accordance with the present invention, it is understood that the same is not limited thereto but is susceptible of numerous changes and modifications as known to a person skilled in the art, and we therefore do not wish to be limited to the details shown and described herein but intend to cover all such changes and modifications as are obvious to one of ordinary skill in the art.

What is claimed is:
1. A vector data processor, comprising:

(a) a main storage;
(b) operation means for sequentially performing an operation on vector elements provided to said operation means in such a manner as to provide vector elements corresponding to the results of said operation in parallel to receiving new vector elements;
(c) a plurality of vector registers each being selected by an instruction, each being accessible independently from each other vector register, and each including means connected to said main storage and said operation means so as to receive vector elements therefrom or to provide vector elements thereto for holding a plurality of vector elements at a plurality of address locations within each vector register;
(d) control means connected to control said vector registers and responsive to instructions, including a plurality of write counter means each connected to a corresponding vector register, for sequentially indicating addresses of said storage locations within the corresponding vector register at which a write operation is to be effected for vector elements received by the corresponding vector register when the corresponding vector register is selected by an instruction so as to receive the vector elements, and including a plurality of read counter means each connected to a corresponding vector register and operable simultaneously with said write counter means connected to said corresponding vector register, for sequentially indicating addresses of storage locations at which a read operation is to be effected for vector elements held by the corresponding vector register when the corresponding vector register is selected by an instruction so as to read the held vector elements.

2. A vector data processor according to claim 1, further comprising:
at least one receive means connected to receive vector elements from any one of said vector registers for sequentially processing vector elements from said vector registers.

3. A vector processor according to claim 2, wherein said control means further includes:
means connected to said plurality of write counter means and said plurality of read counter means and responsive to instructions for enabling said write counter means and said read counter means connected to a selected vector register so as to perform said write operation and said read operation for the selected vector register in an overlapping manner with said sequential read operation being effected after the start of said sequential write operation.

4. A vector data processor according to claim 3, wherein said enabling means includes means for enabling said write counter means and said read counter means connected to the selected vector register to start in response to first and second instructions, respectively.

5. A vector data processor according to claim 3, wherein said enabling means includes means for controlling said plurality of write counter means and said plurality of read counter means so as to sequentially read out a set of vector elements from a first selected vector register, to sequentially provide the vector elements to said operation means as operand vector elements so as to sequentially write into a second selected vector register a set of result vector elements which is a set of vector elements sequentially provided by said operation means as the results of said operation performed on the set of operand vector elements, so as to sequentially read the result vector elements from said second vector register in an overlapping manner with and after start of the writing of the set of result vector elements into said second vector register, and so as to sequentially provide the read out result vector elements to said receive means.

6. A vector data processor according to claim 3, wherein said enabling means includes means connected to said plurality of write counter means and said plurality of read counter means and responsive to a first instruction for enabling read counter means connected to a first vector register selected by the first instruction to perform the read operation for the first vector register and to sequentially provide the read out vector elements to said operation means as operands therefor, responsive to the first instruction for enabling write counter means connected to a second vector register selected by the first instruction to perform said write operation sequentially for result vector elements provided from said operation means as the results of the operation thereby for the operands, and responsive to a second instruction which selects the second vector register for enabling said read counter means connected to said second vector register to perform the read operation for the result vector elements stored in the second vector register, and to provide the read out result vector elements into the second vector register.

7. A vector data processor according to claim 6, wherein said receive means includes adder means for sequentially performing an addition on each of the result vector elements read out from said second vector register and sequentially generating a set of addresses for a set of vector elements stored in said main storage as the results of said addition.

8. A vector data processor, comprising:
storage means for storing plural sets of vector elements;
a plurality of vector registers each having a plurality of addressable memory locations and being connected to said storage means so as to receive vector elements from or provide vector elements to said storage means;
control means connected to said plurality of vector registers and responsive to an instruction for sequentially writing vector elements provided to said plurality of vector registers into plural memory locations of a vector register when the vector register is selected by the instruction to receive the vector elements and responsive to an instruction for sequentially reading vector elements held by a vector register when the vector register is selected by the instruction to provide the held vector elements;
arithmetic means connected to said plurality of vector registers for performing an arithmetic operation on first vector elements read out sequentially from one of said vector registers selected by an instruction which requires execution of the arithmetic operation and for sequentially providing a vector register with vector elements corresponding to the result of the arithmetic operation; and
access means connected to said vector registers and said storage means for performing an operation on second vector elements read out sequentially from one of said vector registers selected by an instruction which requires execution of an access by said access means to provide corresponding to the results of the operation by said access means data signals as a sequence of addresses for said storage means and for sequentially accessing said storage means with the sequence of addresses to fetch and provide third vector elements having the sequence of addresses among the plural sets of vector elements from said storage means to a selected vector register.

9. A vector data processor according to claim 8, wherein the third vector elements comprise vector elements selected from a set of fourth vector elements among the plural sets of vector elements and values of respective second vector elements depend on address differences between the address of the first vector element of the set of fourth vector elements and addresses of respective third vector elements; and
wherein said access means includes a first register for holding the address of the first vector element of the set of fourth vector elements and operation means connected to said first register for performing an operation on the address of the first vector element of the set of fourth vector elements and each of the second vector elements to provide the resultant data signals as the sequence of the addresses for the fourth vector elements.

10. A vector data processor according to claim 9, wherein the values of respective second vector elements are equal to the address differences; and
wherein said operation means comprises adder means.

11. A vector data processor according to claim 10, further comprising another access means connected to said storage means for accessing said storage means, including:
second register means for holding an address of the first vector element of fifth vector elements stored in said storage means;
third register means for holding an incremental value representing a difference between the address of two adjacent vector elements of the fifth vector elements;
address means connected to said second and third register means for repeatedly adding the incremental value to the content of the second register means to generate a sequence of addresses of the fifth vector elements and for sequentially accessing said storage means with the generated sequence of the addresses to fetch and provide the fifth vector elements to said vector registers.

12. A vector data processor according to claim 11, wherein said adder means and said address means share a common adder for use in the addition by said adder means and in the addition by said address means.

13. A vector data processor according to claim 8, wherein said control means includes means responsive to a first kind of instruction for sequentially reading vector elements from a vector register selected by the first kind of instruction to provide the read vector elements to said arithmetic means and for writing vector elements provided from the arithmetic means as a result of the operation on the provided vector elements into a vector register selected by the first kind of instruction and responsive to a second kind of instruction for sequentially reading and providing vector elements from a vector register selected by the second kind of instruction to said access means and for writing vector elements fetched by said access means based upon the provided vector elements into a vector register selected by the second kind of instruction.

14. A vector data processor according to claim 8, wherein said control means includes:
 a plurality of read counter means each connected to control a respective one of said vector registers for sequentially indicating addresses of storage locations within the vector register controlled thereby at which a read operation is effected;
 a plurality of write counter means each connected to control a respective one of said vector registers for sequentially indicating addresses of storage locations within the vector register controlled thereby at which a write operation is effected; and
 means connected to said plurality of read counter means and said plurality of write counter means and responsive to an instruction for selectively controlling said read counter means connected to a vector register selected by the instruction to read vector elements therefrom and said write counter means connected to a vector register selected by the instruction to write vector elements therein, said controlling means being capable of controlling said write counter means and said read counter means both connected to the same vector register in such a manner that read operations are started for the vector register before completion of write operations to the vector register so that vector elements provided from said arithmetic means start to be provided to said access means before completion of writing of the vector elements.

15. A vector data processor according to claim 1, wherein said control means further comprises:
 enabling means connected to said plurality of write counter means and said plurality of read counter means and responsive to an instruction requiring reading of vector elements held in one of said vector registers selected by the instruction so as to provide the held vector elements to said main storage or said operation means for enabling said read counter means connected to said selected vector register so as to read the held vector elements, and responsive to an instruction requiring writing of vector elements provided from said main storage or said operation means into one of said vector registers selected by the instruction of enabling said write counter means connected to said one vector register so as to write the provided vector elements into said one vector register.

16. A vector data processor according to claim 15, further comprising:
 at least one receive means connected to receive vector elements from any one of said vector registers for sequentially processing vector elements from said vector registers; and
 wherein said enabling means includes means connected to said plurality of write counter means and said plurality of read counter means and responsive to a first instruction for enabling read counter means connected to a first vector register selected by the first instruction to perform the read operation for the first vector register and to sequentially provide the read out vector elements to said operation means as operands therefor, responsive to the first instruction for enabling write counter means connected to a second vector register selected by the first instruction to perform said write operation sequentially for result vector elements provided from said operation means as the results of the operation thereby for the operands, and responsive to a second instruction which selects the second vector for enabling said read counter means connected to said second vector register to perform the read operation for the result vector elements stored in the second vector register, and to provide the read out result vector elements to said receive means, wherein said reading of the set of result vector elements from the second vector register for the second instruction is initiated in an overlapping manner with and after start of the writing operation of the result vector elements into the second vector register.

17. A vector data processor according to claim 8, said control means includes select means for selectively connecting a vector register selected by an instruction to said access means so that vector elements held by the selected vector register are transferred to said access means.

18. A vector data processor according to claim 8, wherein said control means includes means responsive to an instruction which requires execution of an arithmetic operation by said arithmetic means for sequentially reading vector elements from a vector register selected by the instruction to provide the read vector elements to said arithmetic means and for writing vector elements provided from the arithmetic means as a result of the operation on the provided vector elements into a vector register selected by the instruction and responsive to an instruction which requires execution of the access by said access means for sequentially reading and providing vector elements from a vector register selected by the access instruction to said access means and for writing vector elements fetched by said access means based upon the provided vector elements into a vector register selected by the access instruction.

19. A vector data processor, comprising:
 storage means for storing plural sets of vector elements;
 a plurality of vector registers each having a plurality of addressable memory locations and being connected to said storage means so as to receive vector elements from or provide vector elements to said storage means;
 control means connected to said plurality of vector registers and responsive to an instruction for sequentially writing vector elements provided to said plurality of vector registers into plural memory locations of a vector register when the vector register is selected by the instruction to receive the vector elements and responsive to an instruction for sequentially reading vector elements held by a vector register when the vector register is selected by the instruction to provide the held vector elements;
 arithmetic means connected to said plurality of vector registers for performing an arithmetic operation on first vector elements read out sequentially from a first vector register selected by an instruction which requires execution of the operation by said arithmetic means and for sequentially providing a second vector register selected by the instruction which requires the arithmetic operation with vector elements corresponding to the result of the operation so that the vector elements are written into the second vector register; and access means connected to said vector registers and said storage means for performing an operation on second vector elements read out sequentially from one of said vector registers selected by an instruction which requires execution of an access by said access means to generate a sequence of addresses for third vector elements stored in said storage means and for sequentially accessing said storage means with the generated sequence of addresses to fetch and provide the third vector elements from said storage means to a third vector register selected by the instruction which requires execution of an access so that the third vector elements are written into the third vector register.

* * * * *